(12) United States Patent
Kojima et al.

(10) Patent No.: US 11,754,531 B2
(45) Date of Patent: Sep. 12, 2023

(54) ULTRASONIC DEVICE

(71) Applicant: SEIKO EPSON CORPORATION, Tokyo (JP)

(72) Inventors: Chikara Kojima, Matsumoto (JP); Kanechika Kiyose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 123 days.

(21) Appl. No.: 17/248,318

(22) Filed: Jan. 20, 2021

(65) Prior Publication Data

US 2021/0231618 A1 Jul. 29, 2021

(30) Foreign Application Priority Data

Jan. 23, 2020 (JP) ................. 2020-008954

(51) Int. Cl.
*G01N 29/22* (2006.01)
*G01S 7/521* (2006.01)
*G01N 29/265* (2006.01)
*G01N 29/24* (2006.01)
*G10K 11/30* (2006.01)

(52) U.S. Cl.
CPC ....... *G01N 29/221* (2013.01); *G01N 29/2456* (2013.01); *G01N 29/265* (2013.01); *G01S 7/521* (2013.01); *G10K 11/30* (2013.01)

(58) Field of Classification Search
CPC ............. G01N 29/221; G01N 29/2456; G01N 29/265; G01S 7/521; G10K 11/30; G10K 9/22
See application file for complete search history.

(56) References Cited

U.S. PATENT DOCUMENTS

2007/0157731 A1 7/2007 Okuda et al.
2016/0058417 A1* 3/2016 Kiyose .................. B06B 1/067
                                                       600/459
2017/0020484 A1* 1/2017 Kiyose ..................... A61B 8/54

FOREIGN PATENT DOCUMENTS

JP        2007189303 A     7/2007

* cited by examiner

*Primary Examiner* — Xin Y Zhong
(74) *Attorney, Agent, or Firm* — CHIP LAW GROUP

(57) ABSTRACT

An ultrasonic device including: an element substrate including a diaphragm, a vibrator provided at the diaphragm, and a first electrode electrically coupled to the vibrator; a protective substrate that is provided at a position facing the element substrate and that includes a second electrode coupled to the first electrode at a position facing the first electrode; a through hole substrate that has a through hole and that faces the element substrate; and a container including a mounting surface on which the protective substrate is disposed, in which the vibrator is provided at a position overlapping the through hole when viewed from a facing direction in which the element substrate and the protective substrate face each other, and is surrounded by the element substrate, the protective substrate, and a jointing member, and the second electrode is provided at an opposite-side surface of the protective substrate from a jointing surface jointed with the mounting surface.

6 Claims, 14 Drawing Sheets

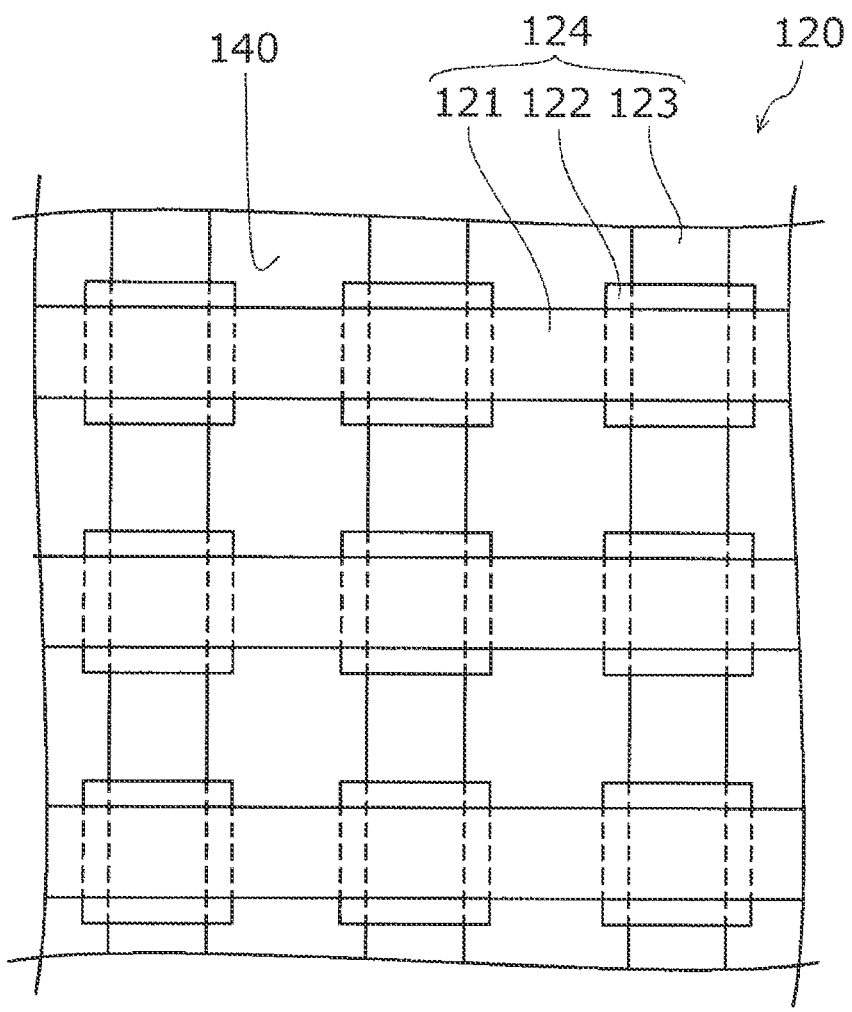
FIG. 5
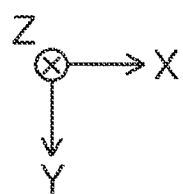

ULTRASONIC DEVICE

The present application is based on, and claims priority from JP Application Serial Number 2020-008954, filed Jan. 23, 2020, the disclosure of which is hereby incorporated by reference herein in its entirety.

BACKGROUND

1. Technical Field

The present disclosure relates to an ultrasonic device.

2. Related Art

Various ultrasonic devices are used in related arts. As an example of such ultrasonic devices, for example, JP-A-2007-189303 discloses an ultrasonic sensor including a first transmission member that receives, by a receiving unit, ultrasonic waves transmitted from a transmission unit and reflected by a detected object, and that transmits the ultrasonic vibration received by the receiving unit, and a second transmission member that transmits ultrasonic vibrations transmitted from the first transmission member.

The ultrasonic sensor according to JP-A-2007-189303 is configured as described above from the viewpoint of protection of a vibrator which is a reception element, that is, improvement of reliability. However, since the ultrasonic sensor according to JP-A-2007-189303 is provided with the first transmission member, the second transmission member, and members for transmitting the ultrasonic vibration, the loss of ultrasonic vibration accompanying the transmission of the vibration may be large, and accuracy may deteriorate. A configuration of the ultrasonic sensor according to JP-A-2007-189303 is complicated.

SUMMARY

An ultrasonic device according to the present disclosure for solving the above problem includes: an element substrate including a diaphragm, a vibrator provided at the diaphragm, and a first electrode electrically coupled to the vibrator; a protective substrate that is provided at a position facing the element substrate and that includes a second electrode coupled to the first electrode at a position facing the first electrode; a through hole substrate that has a through hole and that faces the element substrate; and a container including a mounting surface on which the protective substrate is disposed, in which the vibrator is provided at a position overlapping the through hole when viewed from a facing direction in which the element substrate and the protective substrate face each other, and is surrounded by the element substrate, the protective substrate, and a jointing member, and the second electrode is provided at an opposite-side surface of the protective substrate from a jointing surface jointed with the mounting surface.

BRIEF DESCRIPTION OF THE DRAWINGS

FIG. 5 is a schematic bottom view showing a vibrator in the ultrasonic sensor in FIG. 1.

DESCRIPTION OF EXEMPLARY EMBODIMENTS

Figure 1:
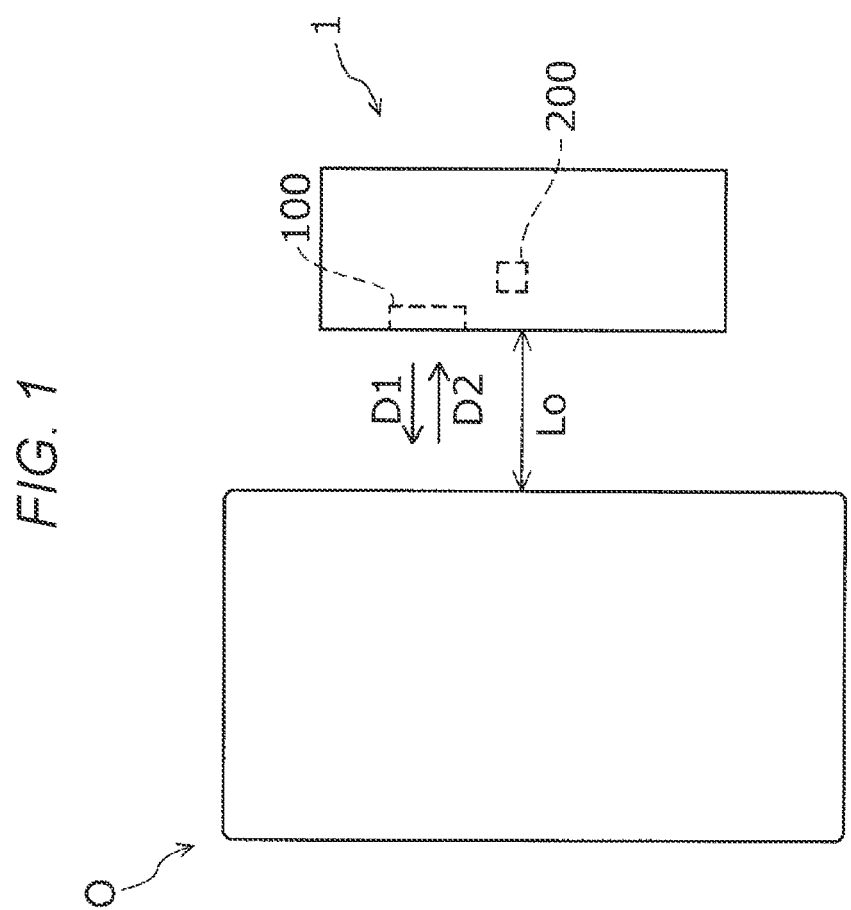
FIG. 1 is a schematic diagram showing an ultrasonic sensor according to a first embodiment serving as an example of an ultrasonic device according to the present disclosure.

First, the present disclosure will be schematically described.

An ultrasonic device according to a first aspect of the present disclosure for solving the above problem includes: an element substrate including a diaphragm, a vibrator provided at the diaphragm, and a first electrode electrically coupled to the vibrator; a protective substrate that is provided at a position facing the element substrate and that includes a second electrode coupled to the first electrode at a position facing the first electrode; a through hole substrate that has a through hole and that faces the element substrate; and a container including a mounting surface on which the protective substrate is disposed, in which the vibrator is provided at a position overlapping the through hole when viewed from a facing direction in which the element substrate and the protective substrate face each other, and is surrounded by the element substrate, the protective substrate, and a jointing member, and the second electrode is provided at an opposite-side surface of the protective substrate from a jointing surface jointed with the mounting surface.

According to this aspect, the vibrator can be protected by providing the vibrator at a position surrounded by the element substrate, the protective substrate, and the jointing member. Since the vibrators are provided at a position overlapping the through hole serving as an entrance of the ultrasonic waves, the ultrasonic waves can be efficiently transmitted and received, and the decrease in accuracy can be prevented. Further, by jointing the protective substrate on the mounting surface of the container, vibration of the protective substrate accompanying vibration of the diaphragm can be prevented. By preventing the vibration of the protective substrate, damage of the protective substrate due to vibration of the protective substrate and a decrease in accuracy due to the vibration of the protective substrate being transmitted to the vibrator can be prevented. Since the second electrode is provided at the opposite-side surface of the protective substrate from the jointing surface jointed with the mounting surface, the jointing with the first electrode becomes easy and a configuration can be simplified. That is, according to the aspect, reliability of the ultrasonic device can be increased and a decrease in accuracy can be prevented without complicating the configuration.

The ultrasonic device according to a second aspect of the present disclosure is directed to the first aspect, in which the protective substrate is larger than the element substrate when viewed from the facing direction.

According to this aspect, since a size of the protective substrate can be increased, strength reliability of the protective substrate itself can be improved, the element substrate can be protected by the large protective substrate, and reliability of the element substrate can also be improved.

The ultrasonic device according to a third aspect of the present disclosure is directed to the first aspect or the second aspect, in which the container includes a third electrode coupled to the second electrode by a wiring, and a second electrode wiring coupling surface to which the wiring of the second electrode is coupled and a third electrode wiring coupling surface to which the wiring of the third electrode is coupled both face a direction to which the mounting surface faces.

According to this aspect, both the direction of the second electrode wiring coupling surface provided at the protective substrate and the direction of the third electrode wiring coupling surface provided in the container are aligned in the direction in which the mounting surface faces. Therefore, mounting of the protective substrate to the container becomes easy, and the reliability of the ultrasonic device can be increased by reducing the mounting failure.

The ultrasonic device according to a fourth aspect of the present disclosure is directed to any one of the first aspect to the third aspect, in which a grid-shaped member is provided in the through hole.

According to this aspect, since the grid-shaped member is provided in the through hole, an entry of foreign matter from the through hole can be prevented. By preventing the entry of the foreign matter from the through hole, damage to the inside of a device due to foreign matter, electrical coupling failure, and the like can be prevented, and the reliability of the ultrasonic device can be improved.

The ultrasonic device according to a fifth aspect of the present disclosure is directed to any one of the first aspect to the fourth aspect, in which a plurality of the through holes are formed.

According to this aspect, the plurality of the through holes are formed, so that an opening diameter per through hole can be reduced, and the entry of foreign matter from the through hole can be prevented. Directivity, a transmission direction, a focal distance, and the like of the ultrasonic waves that change according to the shape and the opening diameter of the through hole can be easily adjusted.

The ultrasonic device according to a sixth aspect of the present disclosure is directed to any one of the first aspect to the fifth aspect, in which a resin member is provided in the through hole.

According to this aspect, the resin member is provided in the through hole. Therefore, for example, when ultrasonic waves are transmitted to the object O in a living body, water, or the like without passing through air, a loss of the ultrasonic wave until the ultrasonic waves reach the object O can be prevented, and thus the accuracy can be increased.

The ultrasonic device according to a seventh aspect of the present disclosure is directed to the sixth aspect, in which the resin member is an acoustic lens.

According to this aspect, the resin member is the acoustic lens. Therefore, the ultrasonic waves can be efficiently converged, and the accuracy can be increased.

Hereinafter, embodiments of the present disclosure will be described with reference to accompanying drawings.

First Embodiment

First, an ultrasonic sensor 1 according to a first embodiment serving as an example of an ultrasonic device according to the present disclosure will be described with reference to FIGS. 1 to 6.

Figure 4:
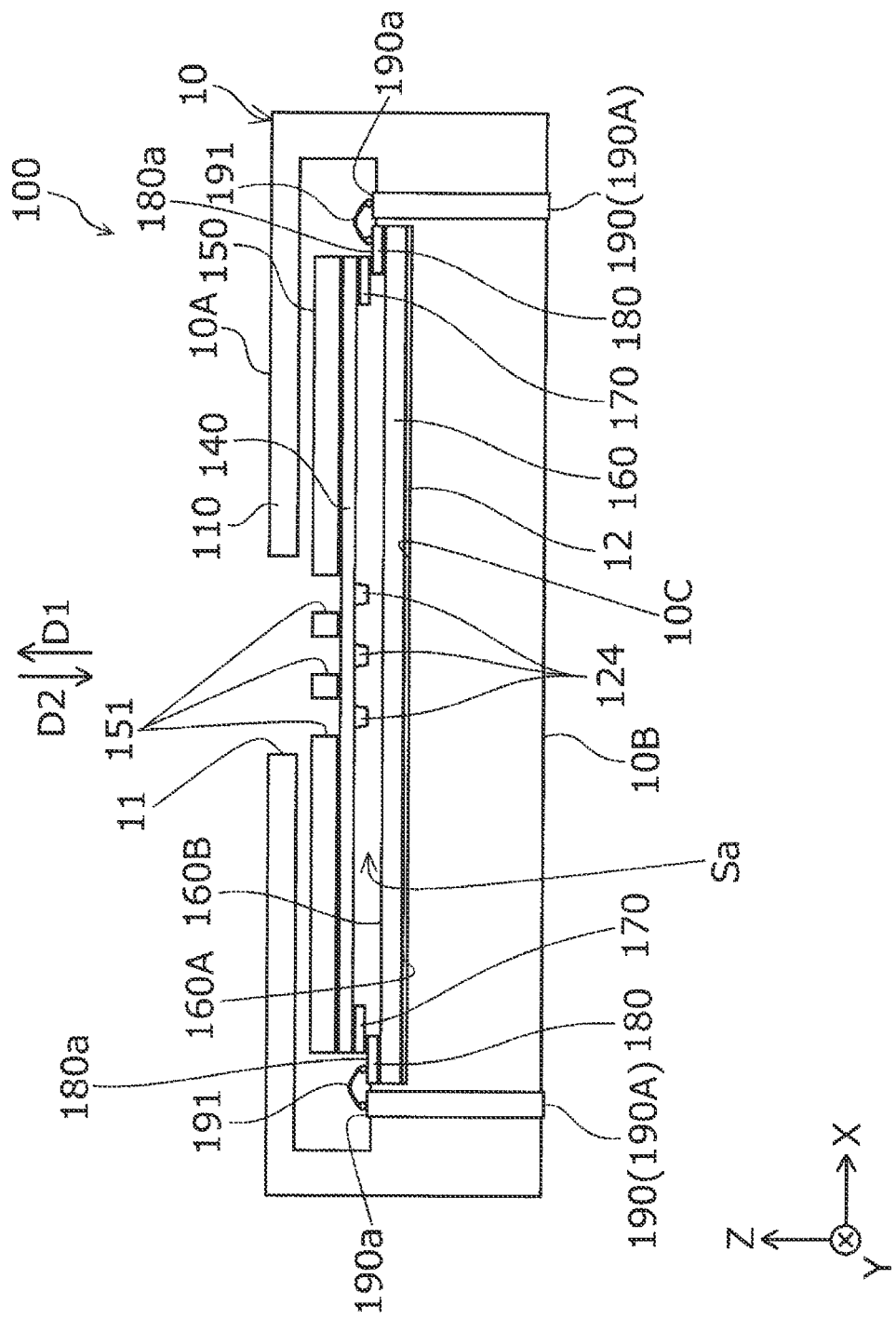
FIG. 4 is a cross-sectional view taken along a line A-A of the transmission and reception unit in FIG. 2.

As shown in FIG. 1, the ultrasonic sensor 1 includes a transmission and reception unit 100 that transmits ultrasonic waves in a transmission direction D1 and receives ultrasonic waves that are reflected by an object O and thereby move in a reception direction D2. Details of the transmission and reception unit 100 will be described later, and the transmission and reception unit 100 includes a vibrator 124 as shown in FIG. 4. The transmission and reception unit 100 includes, as the vibrator 124, a transmission element that transmits ultrasonic waves and a reception element that receives the ultrasonic waves transmitted from the transmission element. The transmission element and the reception element have similar configurations.

The ultrasonic sensor 1 further includes a timer 200 that measures time up to when ultrasonic waves transmitted from the transmission and reception unit 100 are received. The ultrasonic sensor 1 can measure a distance Lo from the ultrasonic sensor 1 to the object O based on the time measured by the timer 200.

Figure 2:
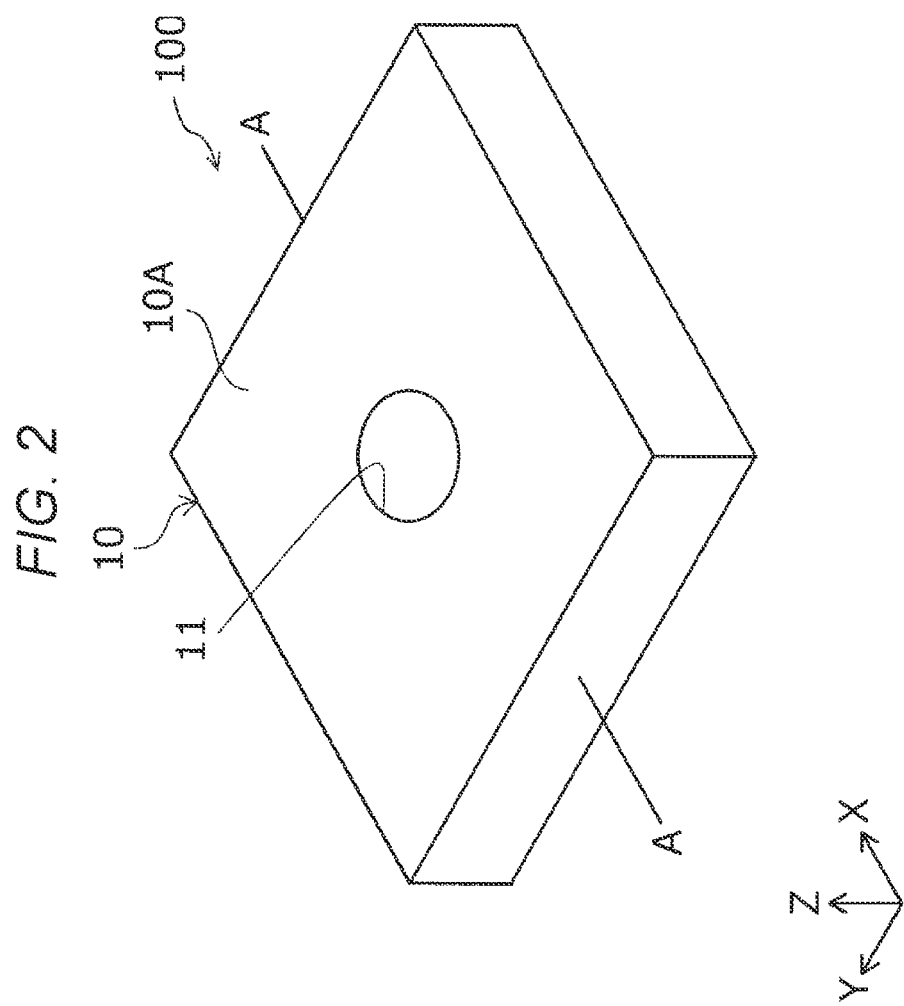
FIG. 2 is a schematic perspective view from a through hole forming surface side of a transmission and reception unit in the ultrasonic sensor in FIG. 1.
Figure 3:
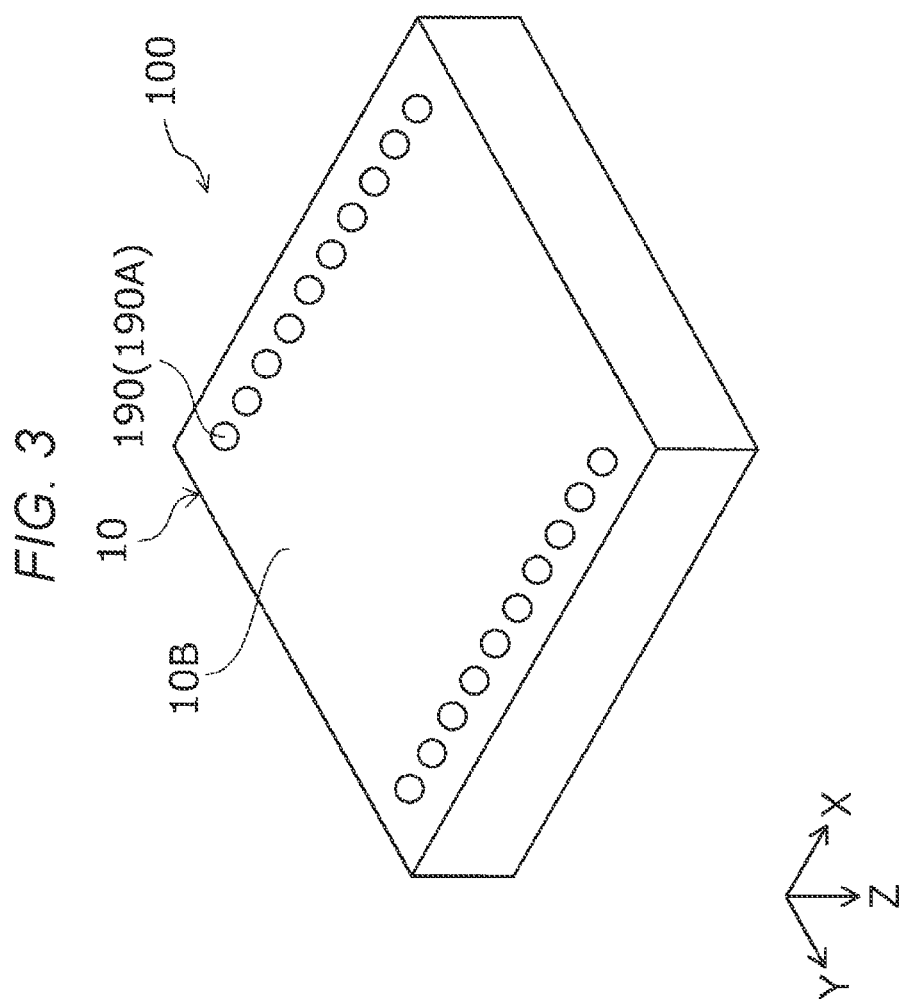
FIG. 3 is a schematic perspective view from a third electrode forming surface side of the transmission and reception unit in the ultrasonic sensor in FIG. 1.

Next, a specific configuration of the transmission and reception unit 100 will be described. As shown in FIGS. 2 to 4, the transmission and reception unit 100 includes a container 10. As shown in FIGS. 2 and 4, a through hole 11 is formed in a through hole substrate 110 on which a through hole forming surface 10A of the container 10 is provided. As shown in FIGS. 3 and 4, third electrodes 190 are provided on a third electrode forming surface 10B of the container 10. FIG. 4 is a plan view showing a state shown in FIG. 4 when the transmission and reception unit 100 having a substantially flat plate shape is placed on a horizontal plane. In FIGS. 2 to 6 and the like, when the transmission and reception unit 100 having the substantially flat plate shape is placed on the horizontal plane, an X-axis direction is a horizontal direction, a Y-axis direction is the horizontal direction and is a direction orthogonal to the X-axis direction, and the Z-axis direction is a vertical direction. The Z-axis direction is a direction in which an element substrate 150 and a protective substrate 160 are facing each other and is a direction along the transmission direction D1 and the reception direction D2 of the ultrasonic waves.

As shown in FIG. 4, the transmission and reception unit 100 includes the element substrate 150 including the plurality of vibrators 124, a diaphragm 140 that is provided with the vibrator 124, and first electrodes 170 electrically coupled to the vibrators 124. Although three vibrators 124 are shown in FIG. 4 for ease of understanding, the number of the actual vibrators 124 in the transmission and reception unit 100 according to the present embodiment is larger. However, the number of the vibrators 124 is not particularly limited. Holes 151 are formed at a position overlapping the vibrators 124 in the Z-axis direction of the element substrate 150 in order to increase the accuracy of transmission and reception of the ultrasonic waves.

As shown in FIG. 4, the transmission and reception unit 100 is provided with the protective substrate 160 at a position facing the element substrate in the Z-axis direction. As shown in FIG. 4, the protective substrate 160 includes second electrodes 180 that each are provided at a position facing a respective one of the first electrodes 170 in the Z-axis direction and are directly in contact with and coupled to the first electrodes 170.

As shown in FIG. 4, the protective substrate 160 is jointed to a mounting surface 10C facing the through hole 11 in the through hole substrate 110 constituting a part of the container 10 by a resin based adhesive 12. In this manner, by jointing the protective substrate 160 on the mounting surface 10C of the container 10, vibration of the protective substrate 160 accompanying vibration of the diaphragm 140 can be prevented. By preventing the vibration of the protective substrate 160, damage of the protective substrate 160 due to vibration of the protective substrate 160 and a decrease in accuracy due to the vibration of the protective substrate 160 being transmitted to the vibrator 124 can be prevented. In the present embodiment, an entire jointing surface 160A of the protective substrate 160 is bonded and jointed to the mounting surface 10C by the adhesive 12. However, the present disclosure is not limited to such a configuration. Only a part of the jointing surface 160A may be bonded and jointed to the mounting surface 10C by the adhesive 12 or the like, or the jointing surface 160A may be jointed to the mounting surface 10C by a method other than using the adhesive 12.

Here, as shown in FIG. 4, the vibrators 124 are provided at positions overlapping the through hole 11 when viewed from the direction along the Z-axis direction. The Z-axis direction is a facing direction in which the element substrate 150 and the protective substrate 160 face each other. In this manner, since the vibrators 124 are provided at positions overlapping the through hole 11 serving as an entrance of the ultrasonic waves, the ultrasonic waves can be efficiently transmitted and received, and the decrease in accuracy can be prevented.

The vibrators 124 are jointed by the element substrate 150, the protective substrate 160, and a jointing member such as the resin based adhesive 12. In other words, a vibrator forming space Sa in which the vibrator 124 is formed is sealed by the element substrate 150, the protective substrate 160, and the jointing member such as the resin based adhesive 12. In this manner, the vibrator 124 can be protected by providing the vibrator 124 at the position surrounded by the element substrate 150, the protective substrate 160, and the jointing member.

As shown in FIG. 4, the second electrode 180 is provided on an opposite-side surface 160B of the protective substrate 160 from the jointing surface 160A jointed with the mounting surface 10C. In this manner, since the second electrode 180 is provided at the opposite-side surface 160B of the protective substrate 160 from the jointing surface 160A jointed with the mounting surface 10C, the jointing with the first electrode 170 becomes easy and a configuration can be simplified. That is, the ultrasonic sensor 1 including the transmission and reception unit 100 according to the present aspect has high reliability as the ultrasonic device, and the decrease in accuracy can be prevented without complicating the configuration.

As shown in FIG. 4, the protective substrate 160 is larger than the element substrate 150 in a horizontal direction along the X-axis direction and the Y-axis direction. In other words, the protective substrate 160 of the ultrasonic sensor 1 is larger than the element substrate 150 when viewed from the direction along the Z-axis direction. In this manner, by increasing a size of the protective substrate 160, strength reliability of the protective substrate 160 itself can be improved, the element substrate 150 can be protected by the large protective substrate 160, and reliability of the element substrate 150 can also be improved.

As shown in FIGS. 3 and 4, the third electrodes 190 are provided in the container 10. As shown in FIG. 4, each third electrode 190 is coupled to a respective one of the second electrodes 180 by a wiring 191, and both a second electrode wiring coupling surface 180a to which the wiring 191 of the second electrode 180 is coupled and a third electrode wiring coupling surface 190a to which the wiring 191 of the third electrode 190 is coupled face upward (the transmission direction D1) in FIG. 4. The transmission direction D1 is a direction to which the mounting surface 10C faces. That is, both the direction of the second electrode wiring coupling surface 180a provided at the protective substrate 160 and the direction of the third electrode wiring coupling surface provided in the container 10 are aligned in the direction to which the mounting surface 10C faces. Therefore, with this configuration, it is easy to mount the protective substrate 160 to the container 10 from a through hole forming surface 10A side to a mounting surface 10C side. The surfaces facing the same side can be coupled by the wiring 191, so that an electrical coupling failure can be easily prevented. Therefore, the reliability of the ultrasonic device can be increased by reducing the mounting failure.

Here, in the transmission and reception unit 100 according to the present embodiment, a part of the vibrators 124 are used as reception elements, and the remaining vibrators 124 are used as transmission elements. As described above, all of the vibrators 124 have the same configuration. That is, all of the transmission elements have the same configuration, all of the reception elements have the same configuration, and all of the transmission elements and all of the reception elements have the same configuration. However, the present disclosure is not limited to this configuration, and for example, each transmission element and each reception element may be configured differently, or the vibrators 124 may be used as a transmission element and a reception element without separating the transmission element and the reception element.

The vibrators 124 according to the present embodiment will be described below with reference to FIG. 5. As shown in FIG. 5, the vibrators 124 are formed by overlapping lower electrodes 123, a piezoelectric layer 122, and upper electrodes 121 along the Z-axis direction. The plurality of lower electrodes 123 extend along the Y-axis direction and are provided in the X-axis direction. The plurality of upper electrodes 121 extend along the X-axis direction and are provided in the Y-axis direction. The piezoelectric layer 122 has a matrix shape in the X-axis direction and the Y-axis direction.

A material of the lower electrode 123 and the upper electrode 121 is not limited, as long as the material has conductivity. Examples of the material of the lower electrode 123 and the upper electrode 121 include a metal material such as platinum (Pt), iridium (Ir), gold (Au), aluminum (Al), copper (Cu), titanium (Ti), and stainless steel, a Tin oxide-based conductive material such as an indium tin oxide (ITO) and a fluorine-doped tin oxide (FTC)), an oxide conductive material such as a zinc oxide-based conductive material, strontium ruthenate ($SrRuO_3$), lanthanum nickel oxide ($LaNiO_3$), and element-doped strontium titanate, and a conductive polymer.

As the piezoelectric layer 122, a composite oxide of a lead zirconate titanate (PZT)-based perovskite structure (an $ABO_3$ type structure) may be typically used. Accordingly, it is easy to ensure a displacement amount of the vibrator 124 which is a piezoelectric element.

As the piezoelectric layer 122, a composite oxide having a perovskite structure (an $ABO_3$ type structure) containing no lead may also be used. Accordingly, the ultrasonic sensor 1 can be implemented using a lead-free material having a small load on the environment.

Examples of such a lead-free piezoelectric material include a BFO-based material containing bismuth ferrite (BFO and $BiFeO_3$). In the BFO, Bi is positioned at an A site, and iron (Fe) is positioned at a B site. Other elements may be added to the BFO. For example, at least one element selected from manganese ironate (Mn), aluminum (Al), lanthanum (La), barium (Ba), titanium (Ti), cobalt (Co), cerium (Ce), samarium (Sm), chromium (Cr), potassium (K), lithium (Li), calcium (Ca), strontium (Sr), vanadium (V), niobium (Nb), tantalum (Ta), molybdenum (Mo), tungsten (W), nickel (Ni), zinc (Zn), praseodymium (Pr), neodymium (Nd), and europium (Eu) may be added to the BFO.

Another example of the lead-free piezoelectric material is a KNN-based material containing potassium sodium niobate (KNN and $KNaNbO_3$). Other elements may be added to the KNN. For example, at least one element selected from manganese ironate (Mn), lithium (Li), barium (Ba), calcium (Ca), strontium (Sr), zirconium (Zr), titanium (Ti), bismuth (Bi), tantalum (Ta), antimony (Sb), iron (Fe), cobalt (Co), silver (Ag), magnesium (Mg), zinc (Zn), copper (Cu), vanadium (V), chromium (Cr), molybdenum (Mo), tungsten (W), nickel (Ni), aluminum (Al), silicon (Si), lanthanum (La), cerium (Ce), praseodymium (Pr), neodymium (Nd), promethium (Pm), samarium (Sm), and europium (Eu) may be added to the KNN.

The composite oxide of a perovskite structure includes a composite oxide deviated from a stoichiometric composition due to deficiency and excess and a composite oxide in which a part of elements is replaced with other elements. That is, as long as a perovskite structure can be obtained, it is acceptable that the composite oxide inevitably deviates from a composition due to lattice mismatch, oxygen deficiency, or the like, a part of elements is replaced, and the like.

Figure 6:
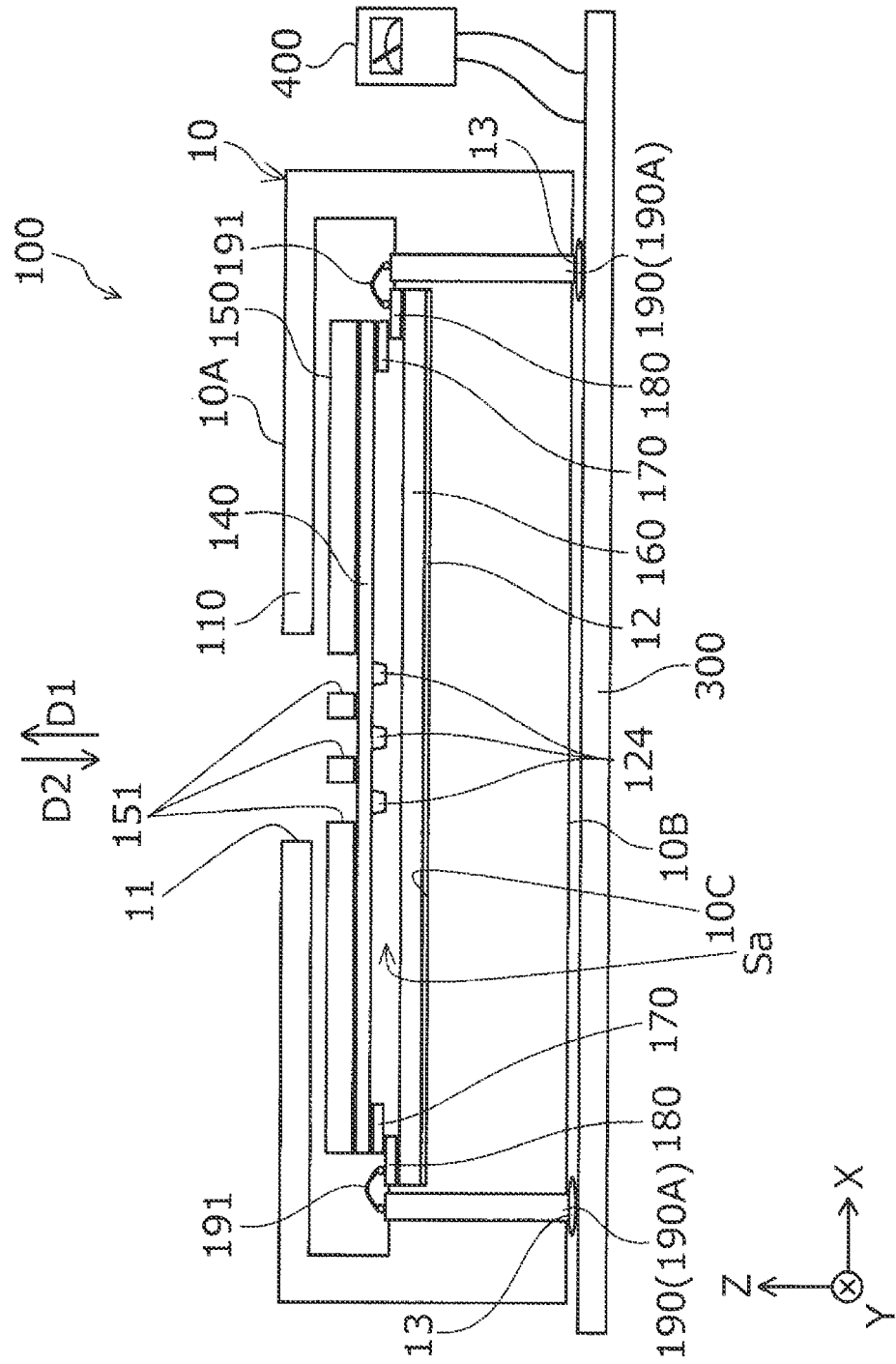
FIG. 6 is a schematic view showing an attachment state of the transmission and reception unit in the ultrasonic sensor in FIG. 4.

Next, a configuration example in which the transmission and reception unit 100 is coupled to the relay substrate 300 will be described with reference to FIG. 6. The relay substrate 300 is electrically coupled to a power supply 400. The third electrode 190 is electrically coupled to the relay substrate 300 by a solder 13. As shown in FIG. 6, the third electrode 190A according to the present embodiment, which is the third electrode 190, includes a flat tip on the third electrode forming surface 10B side of the container 10. Therefore, the transmission and reception unit 100 according to the present embodiment can be electrically coupled to the relay substrate 300 simply and securely by the solder 13. However, the third electrode 190 is not limited to the configuration of the third electrode 190A according to the present embodiment. Hereinafter, the ultrasonic sensor 1 according to a second embodiment in which the configuration of the third electrode 190 is different will be described.

Second Embodiment

Figure 7:
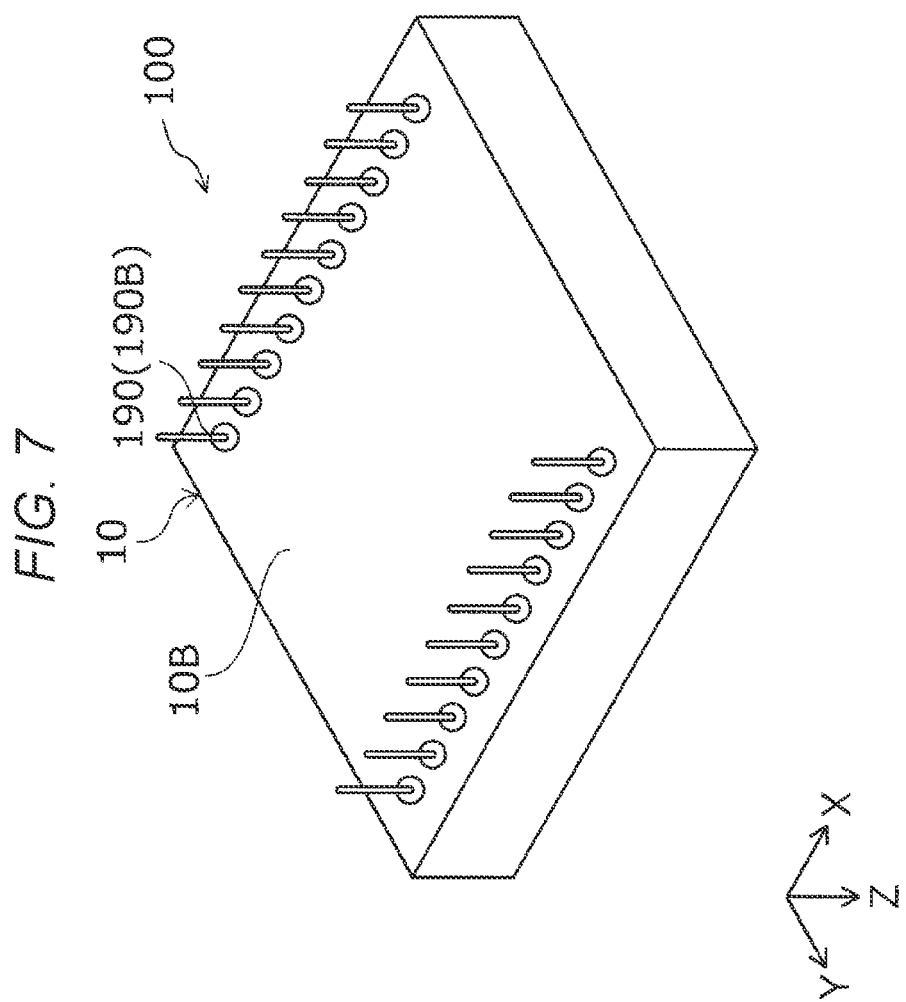
FIG. 7 is a schematic perspective view from a third electrode forming surface side of a transmission and reception unit in an ultrasonic sensor according to a second embodiment.
Figure 8:
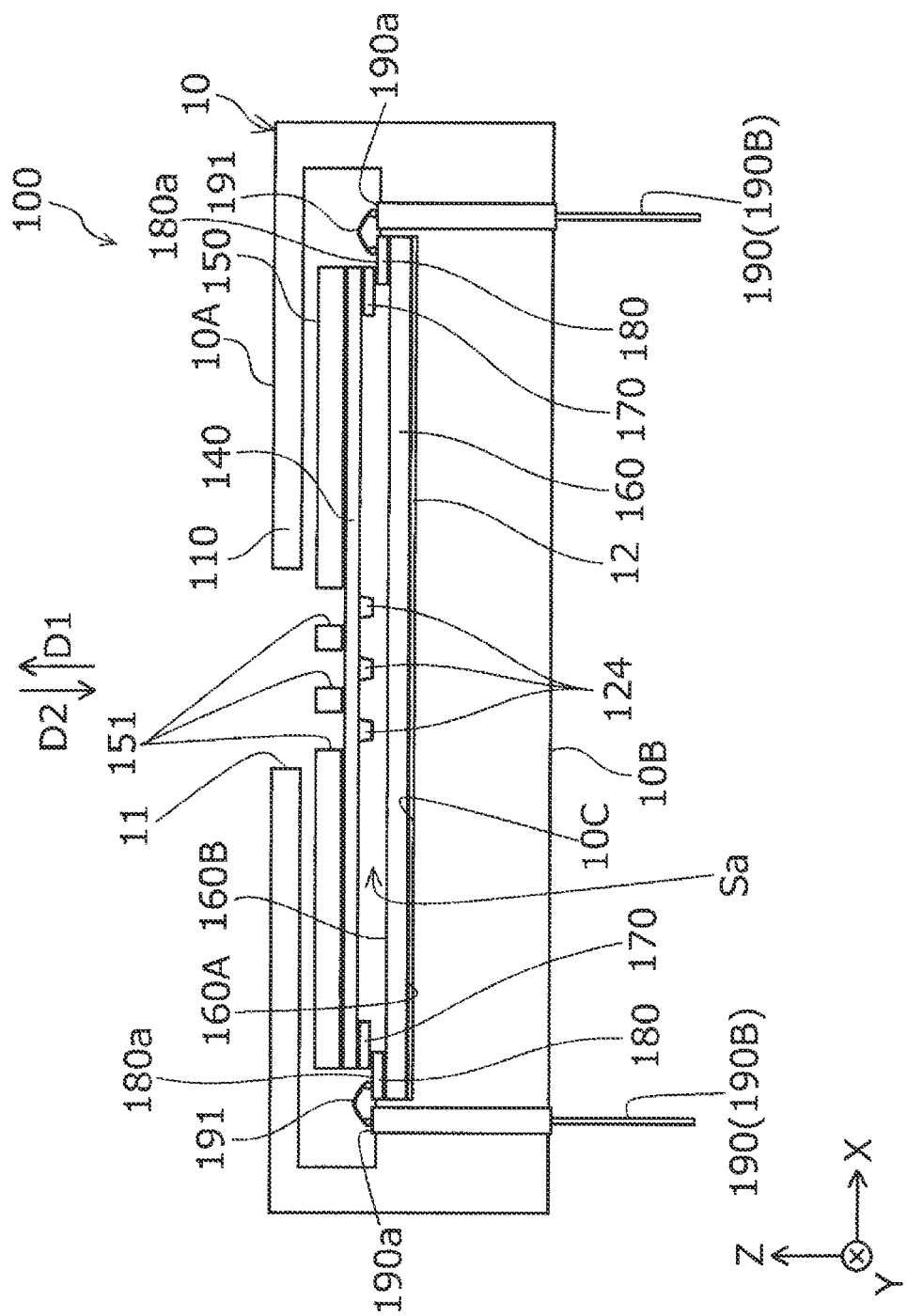
FIG. 8 is a cross-sectional view of the transmission and reception unit in the ultrasonic sensor according to the second embodiment.

Here, the ultrasonic sensor 1 according to the second embodiment will be described with reference to FIGS. 7 and 8. FIG. 7 is a view corresponding to FIG. 3 in the ultrasonic sensor according to the first embodiment, and FIG. 8 is a view corresponding to FIG. 4 in the ultrasonic sensor 1 according to the first embodiment. In FIGS. 7 and 8, components common to those according to the first embodiment are denoted by the same reference numerals, and a detailed description thereof is omitted. The ultrasonic sensor 1 according to the present embodiment has similar characteristics as the ultrasonic sensor 1 according to the first embodiment described above, and has a similar configuration as the ultrasonic sensor 1 according to the first embodiment except for the following points. Specifically, the ultrasonic sensor 1 according to the present embodiment has a similar configuration as the ultrasonic sensor 1 according to the first embodiment except a configuration of the third electrode 190 in the transmission and reception unit 100.

As shown in FIGS. 3 and 4, the third electrode 190A in the ultrasonic sensor 1 according to the first embodiment includes a flat tip on the third electrode forming surface 10B side of the container 10. On the other hand, as shown in FIGS. 7 and 8, a tip of the third electrode 190B in the ultrasonic sensor 1 according to the present embodiment is in a convex shape on the third electrode forming surface 10B side of the container 10. For example, by providing a conductive concave portion or the like that engages with the third electrode 190B on the relay substrate 300, the transmission and reception unit 100 can be easily attached to and detached from the relay substrate 300 without using another member such as the solder 13.

Third Embodiment

Figure 9:
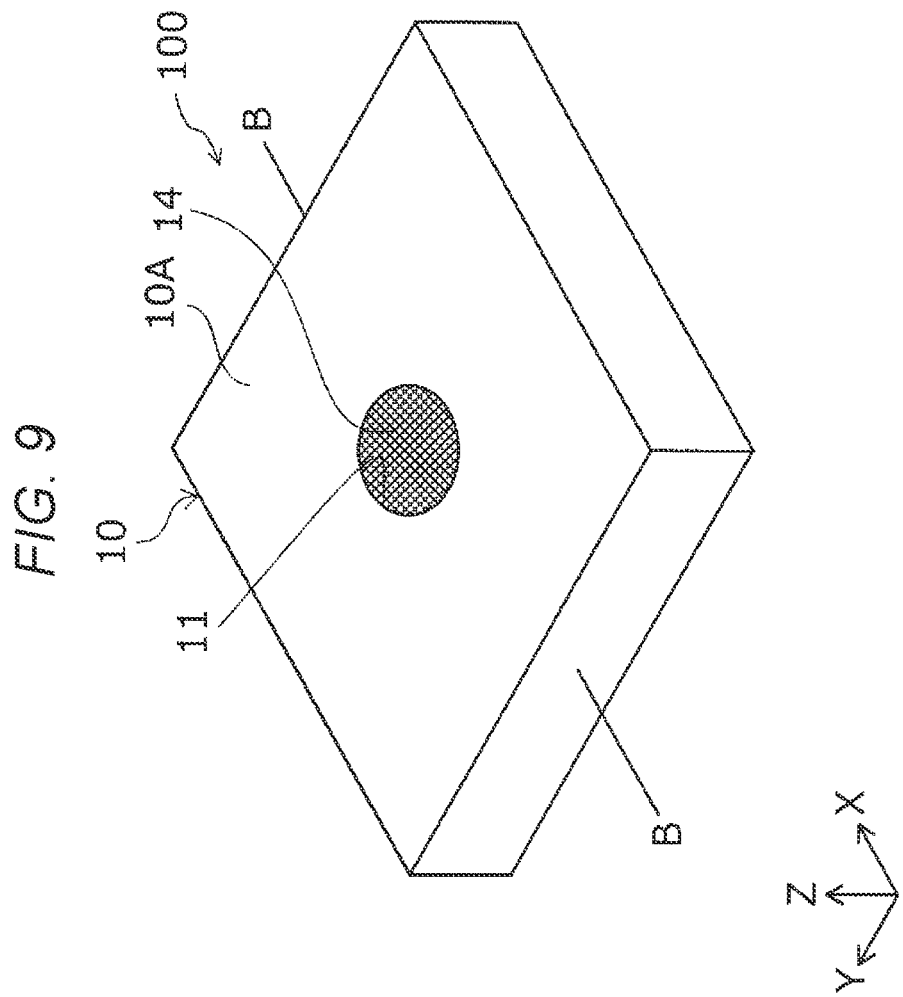
FIG. 9 is a schematic perspective view from a through hole forming surface side of a transmission and reception unit in an ultrasonic sensor according to a third embodiment.
Figure 10:
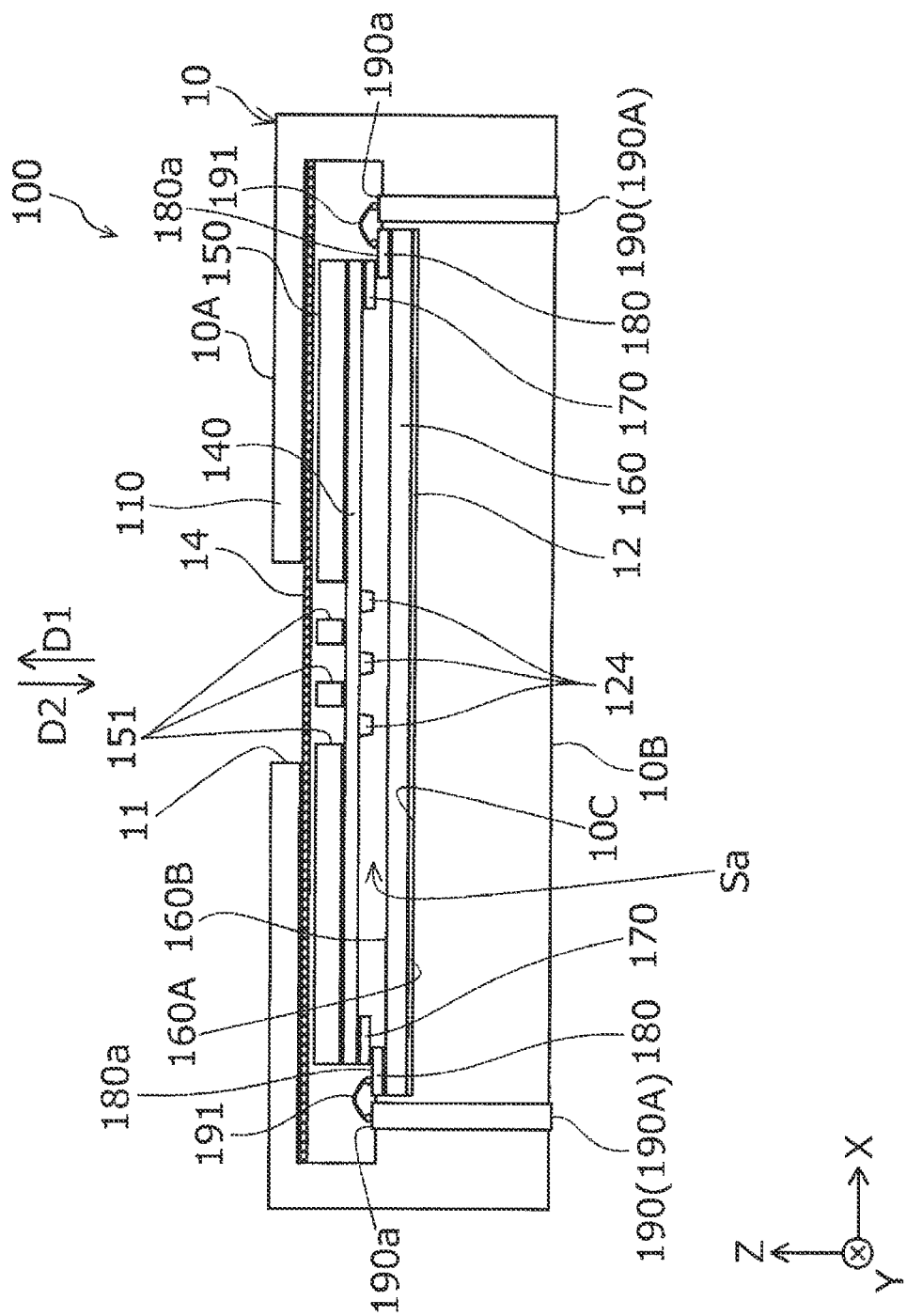
FIG. 10 is a B-B cross-sectional view of the transmission and reception unit in FIG. 9.

Next, the ultrasonic sensor 1 according to a third embodiment will be described with reference to FIGS. 9 and 10. FIG. 9 is a view corresponding to FIG. 2 in the ultrasonic sensor according to the first embodiment, and FIG. 10 is a view corresponding to FIG. 4 in the ultrasonic sensor 1 according to the first embodiment. In FIGS. 9 and 10, components common to those according to the first embodiment and the second embodiment are denoted by the same reference numerals, and a detailed description thereof is omitted. The ultrasonic sensor 1 according to the present embodiment has similar characteristics as the ultrasonic sensor 1 according to the first embodiment described above, and has a similar configuration as the ultrasonic sensor 1 according to the first embodiment except for the following points. Specifically, the ultrasonic sensor 1 according to the present embodiment has a similar configuration as the ultrasonic sensor 1 according to the first embodiment except that the transmission and reception unit 100 includes a metallic mesh member 14.

As shown in FIGS. 9 and 10, the transmission and reception unit 100 in the ultrasonic sensor 1 according to the present embodiment includes the metallic mesh member 14. The metallic mesh member 14 covers the through hole 11 from an inside of the container 10. In other words, the ultrasonic sensor 1 according to the present embodiment is provided with a grid-shaped member in the through hole 11. In this manner, since the grid-shaped member is provided in the through hole 11, an entry of foreign matter from the through hole 11 can be prevented. In addition, by preventing the entry of the foreign matter from the through hole 11, damage to the inside of the transmission and reception unit 100 due to foreign matter, electrical coupling failure, and the like can be prevented, and the reliability of the ultrasonic device can be improved.

As described above, the grid-shaped member according to the present embodiment is the metallic mesh member 14. However, the grid-shaped member is not limited to the metallic mesh member 14. As the grid-shaped member, a mesh member made of a material other than metal may be used, or a member other than the mesh member may be used.

Fourth Embodiment

Figure 11:
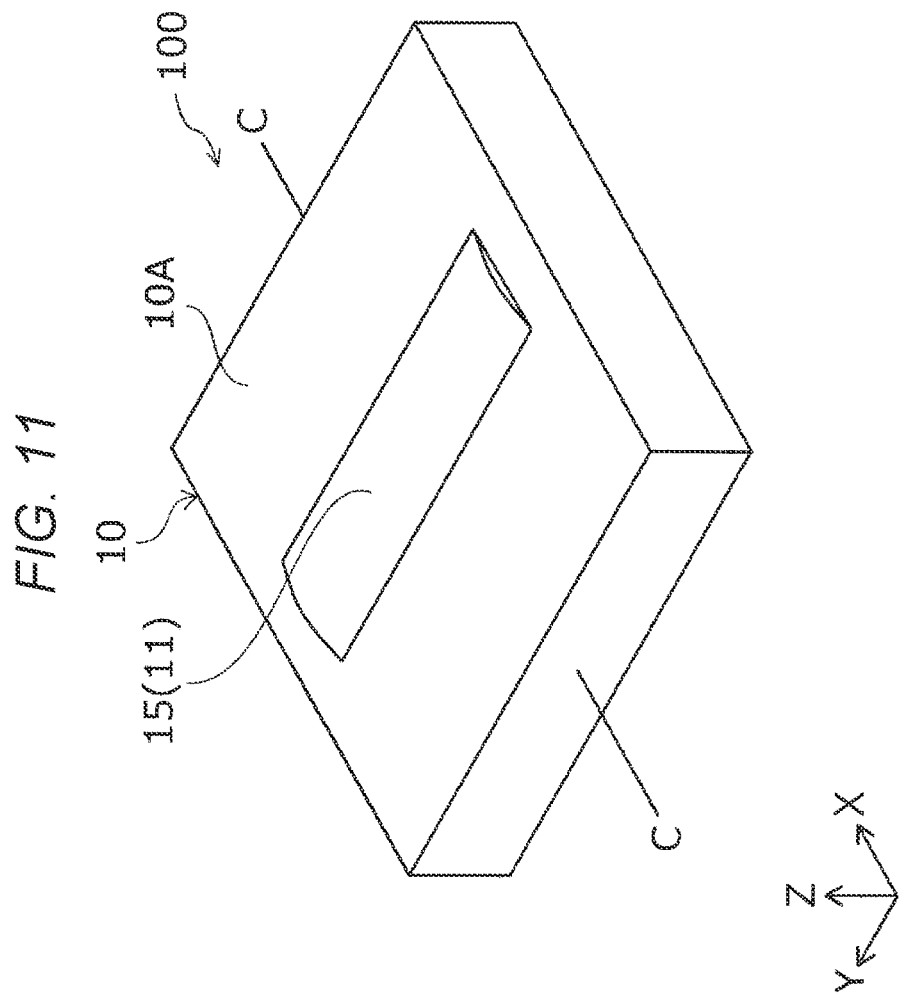
FIG. 11 is a schematic perspective view from a through hole forming surface side of a transmission and reception unit in an ultrasonic sensor according to a fourth embodiment.
Figure 12:
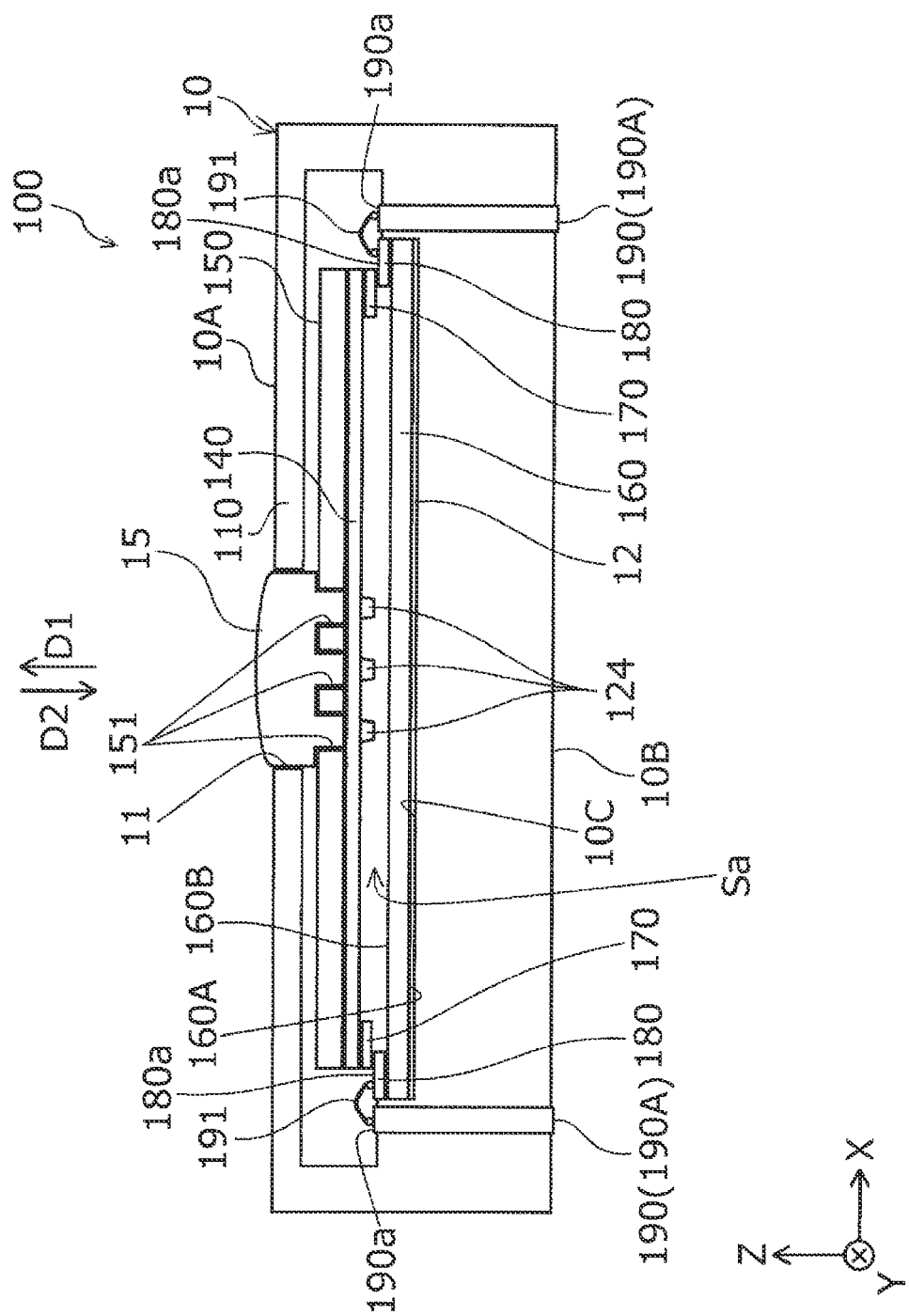
FIG. 12 is a C-C cross-sectional view of the transmission and reception unit in FIG. 11.

Next, the ultrasonic sensor 1 according to a fourth embodiment will be described with reference to FIGS. 11 and 12. FIG. 11 is a view corresponding to FIG. 2 in the ultrasonic sensor according to the first embodiment, and FIG. 12 is a view corresponding to FIG. 4 in the ultrasonic sensor 1 according to the first embodiment. In FIGS. 11 and 12, components common to those according to the first embodiment to the third embodiment are denoted by the same reference numerals, and a detailed description thereof is omitted. The ultrasonic sensor 1 according to the present embodiment has similar characteristics as the ultrasonic sensor 1 according to the first embodiment described above, and has a similar configuration as the ultrasonic sensor 1 according to the first embodiment except for the following points. Specifically, the ultrasonic sensor 1 according to the present embodiment has a similar configuration as the ultrasonic sensor 1 according to the first embodiment except for a shape of the through hole 11 of the transmission and reception unit 100 and that a resin based acoustic lens 15 is provided in the through hole 11.

As shown in FIGS. 11 and 12, the transmission and reception unit 100 in the ultrasonic sensor 1 according to the present embodiment has a rectangular through hole 11 in a plan view seen along the Z-axis direction, and an acoustic lens 15 which is a resin member is provided in the through hole 11. In this manner, since the resin member is provided in the through hole 11, for example, when ultrasonic waves are transmitted to the object O in a living body, water, or the like without passing through air, a loss of the ultrasonic waves until the ultrasonic waves reach the object O can be prevented, and thus the accuracy can be increased. The entry of foreign matter from the through hole 11 can be prevented by covering the through hole 11.

The resin member provided in the through hole 11 is the acoustic lens. Therefore, in the ultrasonic sensor 1 according to the present embodiment, the ultrasonic waves can be efficiently converged, and the accuracy can be increased.

Fifth Embodiment

Figure 13:
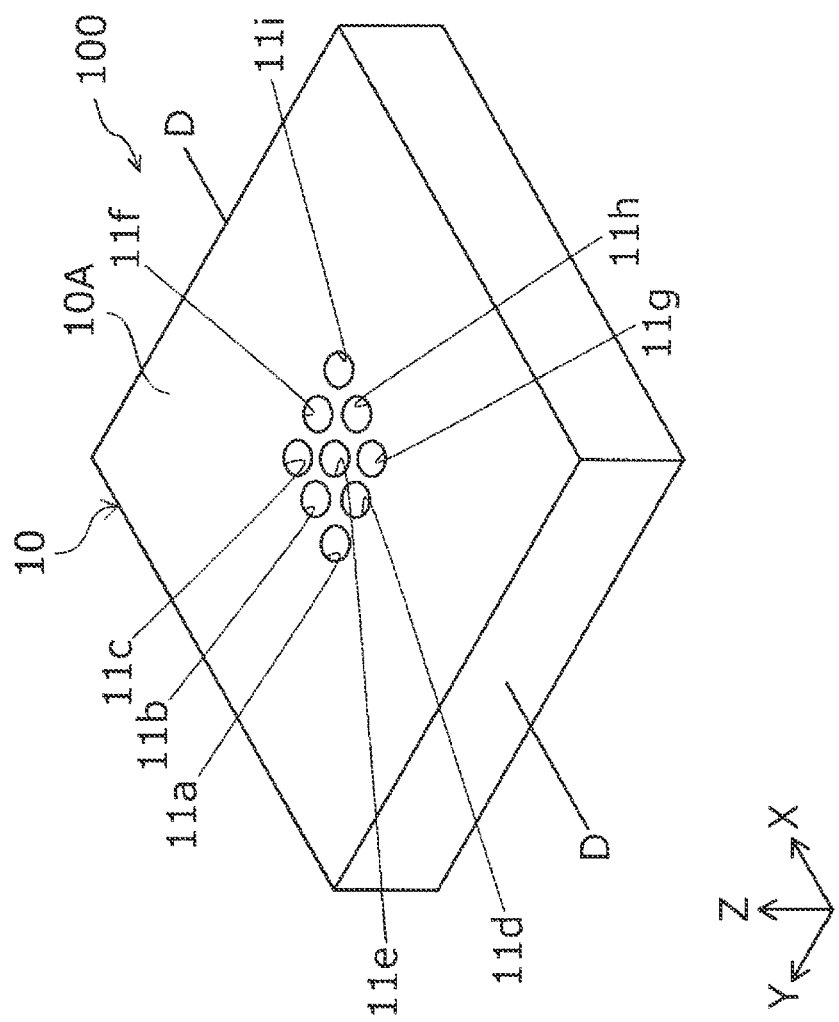
FIG. 13 is a schematic perspective view from a through hole forming surface side of a transmission and reception unit in an ultrasonic sensor according to a fifth embodiment.
Figure 14:
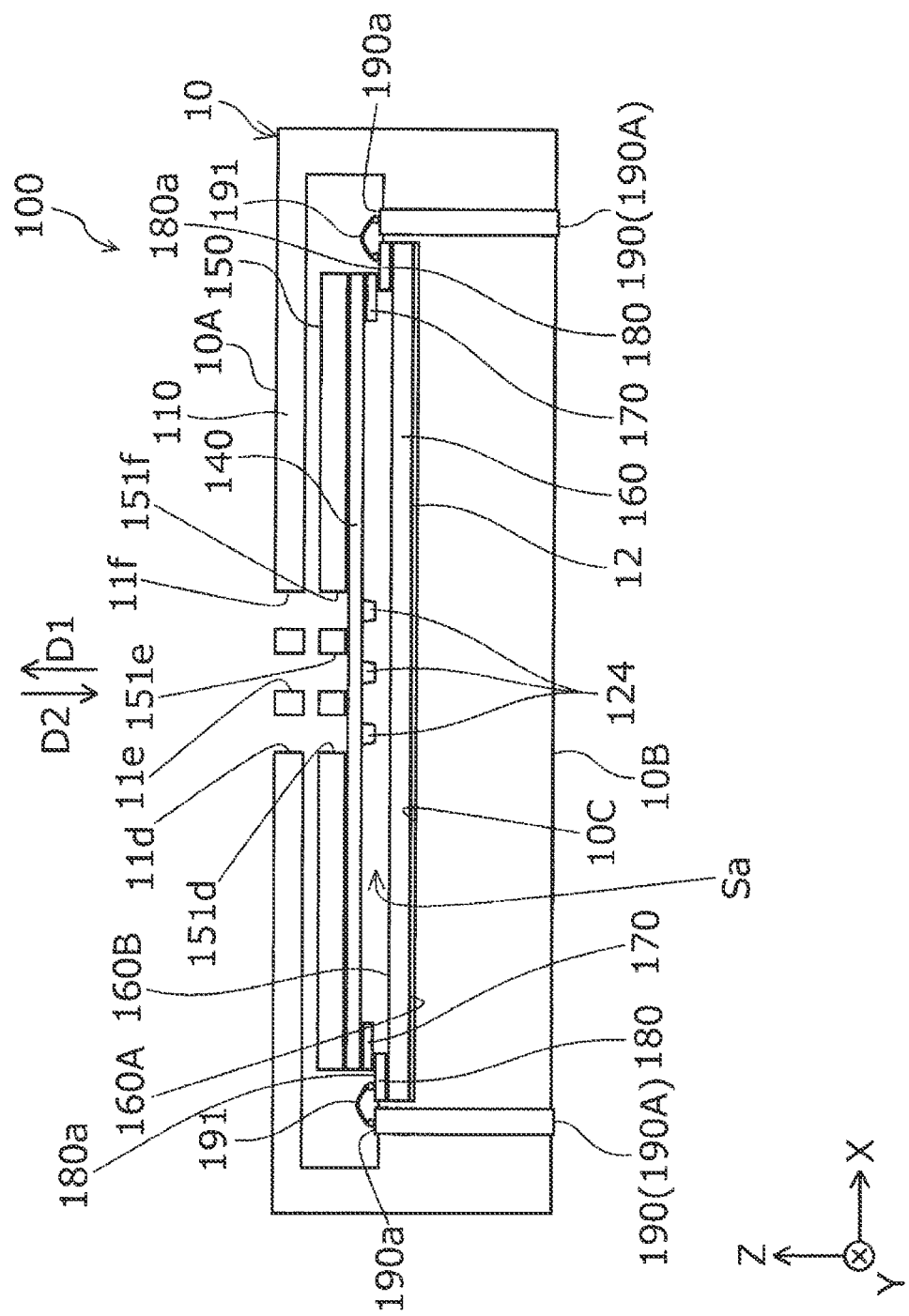
FIG. 14 is a D-D cross-sectional view of the transmission and reception unit in FIG. 13.

Next, the ultrasonic sensor 1 according to a fifth embodiment will be described with reference to FIGS. 13 and 14. FIG. 13 is a view corresponding to FIG. 2 in the ultrasonic sensor according to the first embodiment, and FIG. 14 is a view corresponding to FIG. 4 in the ultrasonic sensor 1 according to the first embodiment. In FIGS. 13 and 14, components common to those according to the first embodiment to the fourth embodiment are denoted by the same reference numerals, and a detailed description thereof is omitted. The ultrasonic sensor 1 according to the present embodiment has similar characteristics as the ultrasonic sensor 1 according to the first embodiment described above, and has a similar configuration as the ultrasonic sensor 1 according to the first embodiment except for the following points. Specifically, the ultrasonic sensor 1 according to the present embodiment has the same configuration as the ultrasonic sensor 1 according to the first embodiment except for the number and a size of the through holes 11 of the transmission and reception unit 100.

As shown in FIGS. 13 and 14, the transmission and reception unit 100 in the ultrasonic sensor 1 according to the present embodiment has a plurality of through holes 11. In this manner, the plurality of through holes 11 are formed, so that an opening diameter per through hole 11 can be reduced, and the entry of foreign matter from the through hole 11 can be prevented. The plurality of through holes 11 are formed, so that directivity, the transmission direction, a focal distance, and the like of the ultrasonic waves that change according to the shape and the opening diameter of the through hole 11 can be easily adjusted. For example, by reducing the opening diameter, the focal distance from the through hole 11 can be shortened.

As shown in FIG. 13, the ultrasonic sensor 1 according to the present embodiment is formed with nine through holes 11 including a through hole 11a, a through hole 1ib, a through hole 11c, a through hole 11d, a through hole 11e, a through hole 11f, a through hole 11g, a through hole 11h, and a through hole 11i. The through hole 11a is formed at a position facing a hole 151a (not shown) in the Z-axis direction, the through hole 1ib is formed at a position facing a hole 151b (not shown) in the Z-axis direction, and the through hole 11c is formed at a position facing a hole 151c (not shown) in the Z-axis direction. The through hole 11d is formed at a position facing a hole 151d in the Z-axis direction as shown in FIG. 14, the through hole 11e is formed at a position facing a hole 151e in the Z-axis direction as shown in FIG. 14, and the through hole 11f is formed at a position facing a hole 151f in the Z-axis direction as shown in FIG. 14. The through hole 11g is formed at a position facing a hole 151g (not shown) in the Z-axis direction, the through hole 11h is formed at a position facing a hole 151h (not shown) in the Z-axis direction, and the through hole 11i is formed at a position facing a hole 151i (not shown) in the Z-axis direction.

In FIG. 14, although the through hole 11 and the hole 151 facing the vibrator 124 face each other in the Z-axis direction in a one-to-one way, the present disclosure is not limited to such a configuration. For example, a plurality of vibrators 124 and holes 151 may be formed at positions facing the through holes 11 in the Z-axis direction.

The present disclosure is not limited to the embodiments described above, and can be implemented in various configurations without departing from the scope of the disclosure. In order to solve a part or all of problems described above, or to achieve a part or all of effects described above, technical characteristics in the embodiments corresponding to technical characteristics in aspects described in the summary can be replaced or combined as appropriate. If the technical characteristics are not described as essential in the present description, the technical characteristics can be deleted as appropriate.

What is claimed is:

1. An ultrasonic device, comprising:
an element substrate including a diaphragm, a vibrator provided at the diaphragm, and a first electrode electrically coupled to the vibrator;
a protective substrate that is provided at a position facing the element substrate and that includes a second electrode coupled to the first electrode at a position facing the first electrode;
a through hole substrate that has a through hole and that faces the element substrate; and
a container including:

a mounting surface on which the protective substrate is disposed; and a third electrode that is coupled to the second electrode by a wiring, wherein the third electrode is inside the container, the wiring is coupled to each of a second electrode wiring coupling surface of the second electrode and a third electrode wiring coupling surface of the third electrode, each of the second electrode wiring coupling surface and the third electrode wiring coupling surface faces upward in a direction at which the mounting surface faces, the mounting surface is different from the third electrode wiring coupling surface, the vibrator is provided at a position overlapping the through hole when viewed from a facing direction in which the element substrate and the protective substrate face each other, and is surrounded by the element substrate, the protective substrate, and a jointing member, and the second electrode is provided at an opposite-side surface of the protective substrate from a jointing surface jointed with the mounting surface.

2. The ultrasonic device according to claim 1, wherein the protective substrate is larger than the element substrate when viewed from the facing direction.

3. The ultrasonic device according to claim 1, wherein a grid-shaped member is provided in the through hole.

4. The ultrasonic device according to claim 1, wherein a plurality of through holes is formed.

5. The ultrasonic device according to claim 1, wherein a resin member is provided in the through hole.

6. The ultrasonic device according to claim 5, wherein the resin member is an acoustic lens.

* * * * *